United States Patent
Day et al.

(10) Patent No.: US 7,243,882 B2
(45) Date of Patent: Jul. 17, 2007

(54) GAUGE DISPLAY ASSEMBLY

(75) Inventors: Gregory E. Day, Great Falls, VA (US); Dwight C. Green, Ashburn, VA (US)

(73) Assignee: Gauge Works, LLC, Dulles, VA (US)

(*) Notice: Subject to any disclaimer, the term of this patent is extended or adjusted under 35 U.S.C. 154(b) by 178 days.

(21) Appl. No.: 11/013,256

(22) Filed: Dec. 15, 2004

(65) Prior Publication Data

US 2006/0124815 A1   Jun. 15, 2006

(51) Int. Cl.
*G12B 9/00* (2006.01)
(52) U.S. Cl. .............. 248/27.1; 248/115; 248/27.3; 248/114; 248/116; 180/90
(58) Field of Classification Search ........... 248/115, 248/27.1, 27.3, 223.1, 291, 114, 116
See application file for complete search history.

(56) References Cited

U.S. PATENT DOCUMENTS

| | | | | |
|---|---|---|---|---|
| 1,428,902 A | * | 9/1922 | Porter ..................... 368/316 |
| 1,441,279 A | * | 1/1923 | Hammarlund ............ 368/316 |
| 1,471,797 A | * | 10/1923 | Cortez et al. ............ 248/115 |
| 1,479,627 A | * | 1/1924 | Porter ..................... 368/316 |
| 1,497,922 A | * | 6/1924 | Frederick ................. 248/27.1 |
| 1,537,823 A | * | 5/1925 | Henderson ............... 116/312 |
| 1,541,644 A | * | 6/1925 | Herbermann ............ 368/153 |
| 1,579,763 A | * | 4/1926 | Hammond ................ 248/115 |
| 1,588,254 A | * | 6/1926 | Matthews ................. 235/96 |
| 1,617,975 A | * | 2/1927 | Whittier .................. 374/205 |
| 1,639,598 A | * | 8/1927 | Leo ......................... 248/27.3 |
| 1,665,491 A | * | 4/1928 | Clark ...................... 248/27.1 |
| 1,678,990 A | * | 7/1928 | Mansfield ................ 248/115 |
| 1,792,186 A | * | 2/1931 | Rishel ..................... 248/115 |
| 1,884,938 A | * | 10/1932 | Weir ....................... 248/27.1 |
| 1,903,153 A | * | 3/1933 | Weir ....................... 248/27.1 |
| 2,074,895 A | * | 3/1937 | Durant .................... 340/451 |
| 2,076,491 A | * | 4/1937 | Allen et al. .............. 361/660 |
| 2,425,444 A | * | 8/1947 | Stover ..................... 248/27.1 |
| 2,527,940 A | * | 10/1950 | Krueger ................... 362/23 |
| 2,815,662 A | * | 12/1957 | Thomas ................... 73/29.02 |
| 2,978,215 A | * | 4/1961 | Victor et al. ............ 248/115 |
| 2,991,967 A | * | 7/1961 | Costas ..................... 248/309.1 |
| 3,045,960 A | * | 7/1962 | Margulies ................ 248/442 |
| 3,241,794 A | * | 3/1966 | Little ...................... 248/27.1 |
| 3,589,656 A | * | 6/1971 | Protzmann .............. 248/27.1 |
| 3,981,470 A | * | 9/1976 | Rutili et al. ........... 248/292.12 |
| 4,348,899 A | * | 9/1982 | Muller ..................... 73/431 |
| 4,413,797 A | * | 11/1983 | Donkervoort ........... 248/27.1 |
| 4,685,035 A | * | 8/1987 | Nanjoh .................... 361/829 |
| 4,948,074 A | * | 8/1990 | Bramhall, Jr. ........... 248/27.1 |
| 5,004,634 A | * | 4/1991 | Anthony .................. 428/31 |
| 5,259,655 A | * | 11/1993 | Anderson ................. 296/70 |
| 6,016,596 A | * | 1/2000 | Rodgers ................... 29/426.6 |
| 6,244,107 B1 | * | 6/2001 | Nelson et al. ............ 73/431 |
| 6,508,192 B2 | * | 1/2003 | Lentine ................... 114/343 |

(Continued)

*Primary Examiner*—Anita King
*Assistant Examiner*—Michael McDuffie
(74) *Attorney, Agent, or Firm*—Williams Mullen, P.C.; Thomas F. Bergert

(57) ABSTRACT

An assembly for attaching gauges or other accessories to vehicles provides a rampart member for securing the assembly to a vehicle surface and a gauge display member secured to the rampart member for receiving and displaying gauges and other instruments.

20 Claims, 3 Drawing Sheets

U.S. PATENT DOCUMENTS

| | | |
|---|---|---|
| D476,276 S | 6/2003 | Day |
| D484,081 S | 12/2003 | Day |
| D486,435 S | 2/2004 | Day et al. |
| D496,617 S | 9/2004 | Day et al. |
| 6,938,859 B2 * | 9/2005 | Beausoleil ................. 248/27.1 |
| D514,994 S | 2/2006 | Day |

* cited by examiner

GAUGE DISPLAY ASSEMBLY

FIELD OF THE INVENTION

The present invention relates generally to an apparatus for mounting items to, and displaying items on, vehicles. More particularly, the invention relates to a rigid and versatile apparatus for supporting instruments or other items from available areas of vehicles, such as the areas surrounding the typical rear view mirror location.

BACKGROUND

Many forms of personal transportation lack desired controls, indications, or accessories suited to the personal tastes of the individual or individuals using the transportation. Automobile manufacturers provide a basic level of indicators and displays (e.g., speedometer, engine temperature, and fuel level, with warning lights for various other indicators) and forego the addition of ancillary instruments and gauges to keep their costs low. Simple efforts at adding gauges and other instruments to a vehicle's interior often sacrifice the stability of the factory equipment to which the instruments are attached, and further sacrifice the safety of the passengers by not adequately supporting the added instruments.

These problems provide opportunities for creative aftermarket solutions. Because of the expense of design and production, after-market manufacturers try to design products applicable to a wide variety of makes or styles of vehicles. Therefore, it is important that after-market solutions be versatile, capable of suiting most drivers regardless of the vehicle. Ideally, the flexibility of orientation and location would help a variety of drivers of a single vehicle to achieve spatial compatibility with the installed indications. Such products should also be effective, safe, inexpensive, and easy for the driver to install.

Most vehicles feature some exposed, available surface. For example, vehicles used in motor sports are likely to provide roll over protection through tubular roll bars or cages; additionally, in some of these vehicles the A-pillar is also an exposed tube. Larger vehicles, such as boats and automobiles may have free surfaces on dashboards or consoles in front and below the driver's field of view, as well as on the windshield or on the roof in front and above the driver's field of view. Such spots provide an opportunity for mounting one or more gauges, controls, or accessories.

Different drivers, and even different positions of a single driver can require a broad range of adjustment to preserve spatial compatibility of an important gauge or indication. Additionally, items such as gauges typically must be connected by wiring to the equipment measuring the given vehicle performance or other parameter to be displayed by the gauge. This requires provisioning for wire hookup and discrete wire covering.

SUMMARY OF THE INVENTION

The present invention is directed to an improved gauge mounting assembly for overcoming the above and other challenges. In one embodiment, the invention includes a gauge display member having a face portion, a beard portion and an interior wall. The face portion is provided with a substantially horizontal top edge lying in a substantially horizontal plane when the mount is in an upright position, and the beard portion can be integrally formed with the face portion. The beard portion extends outwardly from the side and lower edges of the face portion, and the face portion includes at least one opening through which a gauge or other instrument may be viewed. The invention further includes a rampart member securable to the interior wall of the gauge display member. In one embodiment, the rampart member is secured to the gauge display member by means of a lip portion extending along a lower inner portion of the rampart member, which provides a flat surface of sufficient surface area to securely mate with the gauge display member interior wall. When the gauge display member and the rampart member are secured, an opening is created through which gauges, instruments and wiring may be positioned and maintained.

DETAILED DESCRIPTION

With reference to the drawings, as shown in FIGS. 1 through 5, there is provided a gauge mounting assembly 10 having a gauge display member 15 and a rampart member 20. The rampart member 20 secures the assembly of the present invention to a mounting surface of a vehicle as described hereinafter.

Figure 1:
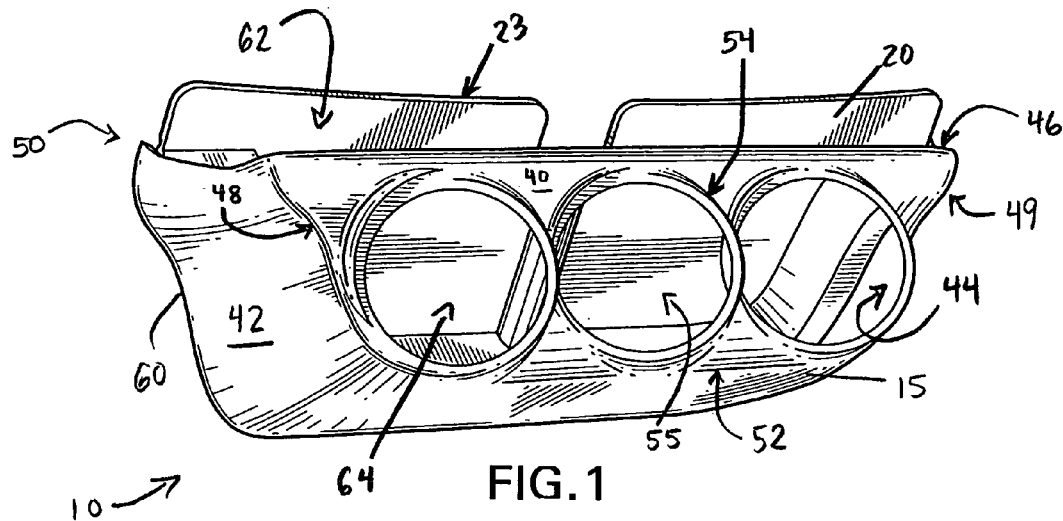
FIG. 1 is a front perspective view of one embodiment of the gauge mount assembly of the present invention.
Figure 2:
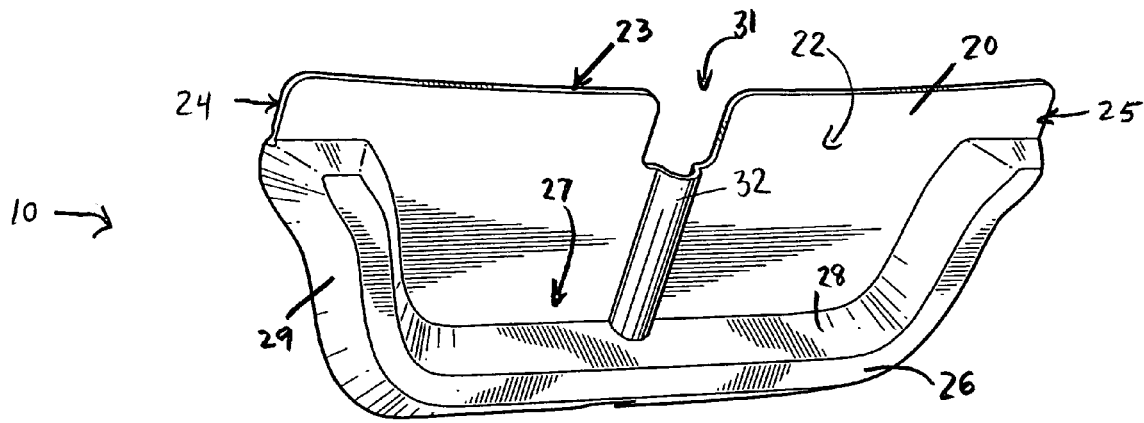
FIG. 2 is a perspective view showing the gauge display member and rampart member of the embodiment of FIG. 1.
Figure 2:
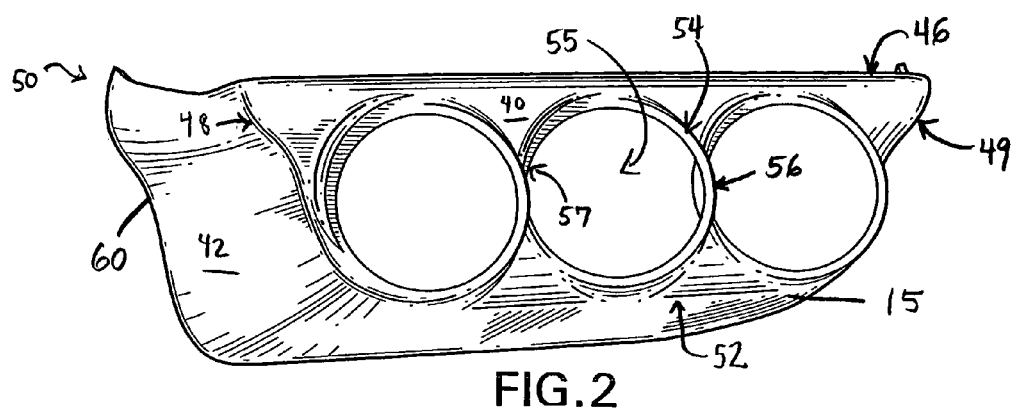
Figure 5:
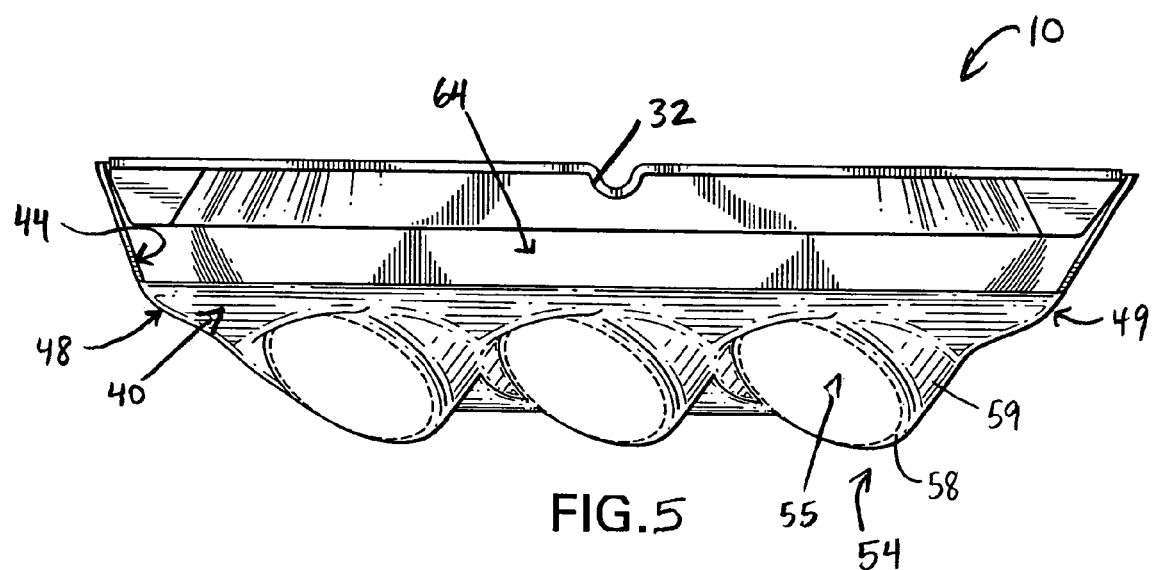
FIG. 5 is a top plan view of the embodiment of the gauge mount assembly shown in FIG. 1.

As shown in FIGS. 1, 2 and 5, the gauge display member has a face portion 40, a beard portion 42 and an interior wall 44. The face portion 40 has a substantially horizontal top edge 46 lying in a substantially horizontal plane when the mount is in an upright position as shown in FIG. 1. The beard portion 42, which may be formed integrally with the face portion 40, for example, extends outwardly from the left 48 and right 49 edges of the face portion 40. In one embodiment, this extension is such that the beard portion 42 extends at least partially higher than the plane of the face portion top edge, as indicated at 50, for example. In this way, the beard portion can mate in a substantially flush relationship with external vehicle components such as a windshield, roof or headliner, for example. This assists in the stability and the overall aesthetics of the device of the present invention. Further in this embodiment, the beard portion can adequately cover the elements maintained within the pocket formed by the gauge display member and rampart member, as discussed hereinafter. As further shown in FIGS. 1 and 2, the beard portion 42 also extends downwardly from a front lower edge 52 of the face portion 40. The downward extension of the beard portion 42 is adequate to mate with a bottom external support surface, e.g., a windshield.

The face portion 40 is formed with one or more substantially circular, part-cylindrical and/or other shaped rings 54 so as to provide one or more openings 55 therein, through which an installed gauge or other instrument may be viewed, for example. In one embodiment, each ring edge 58 forms the perimeter of the respective opening 55 and the ring body 59 and edge 58 are configured to receive and/or retain a portion of the gauge or instrument for display. In this way, the face of the gauge or other instrument (shown in dashed lines in FIG. 5 and at 75 in FIG. 4) can extend through the opening, with the remaining body portion of the gauge residing in the cavity created by the mating of the gauge display member and the rampart member, supported in one embodiment at least in part by the ring body 59, and discussed more completely elsewhere herein. In one embodiment, as shown in FIGS. 1 and 2, one or more of the rings 54 can be offset such that a portion 56 of the ring extends outwardly from the face portion 40 and a portion 57 of the ring extends into the face portion. In another embodiment, the rings 54 can extend perpendicularly outwardly from the face portion. In another embodiment, the rings 54 can be flat against front wall 40. In the embodiment of the invention with multiple rings, while the rings may be constructed to lie in parallel planes, the invention may be constructed such that any two or more rings can lie in parallel planes, or such that no two rings lie in parallel planes. In another embodiment, the ring member is not provided in substantially circular or part-cylindrical form, but rather in another geometric form provided with an opening for housing an item which is not substantially cylindrical or circular in cross-section, for example.

As further shown in FIGS. 1 and 2, the face portion left 48 and right 49 edges extend upwardly and outwardly from a lower edge 52 of the face portion to the top edge 46. In this way, when the beard portion 42 is formed or secured to the face portion, the edges 60 of the beard portion can more naturally flow to the external support surface (e.g., the windshield 70 in FIG. 4). The shape of the face and beard portion thus provide aesthetically pleasing lines which may be consistent with the vehicle's internal lines, for example, while further functioning to assist in the mating of elements so as to enclose interior items (gauges, wiring, etc.) from view when installed.

As shown in FIGS. 1 through 3 and 5, the rampart member 20 has a substantially flat section 22 with an upper edge 23 and left 24 and right 25 edges. In one embodiment, as shown in FIG. 1, the rampart member upper edge 23 extends substantially horizontally in a plane which is above and substantially co-planar to the top edge of display member 15. The rampart member 20 further is provided with a lip portion 26 extending from the left edge to the right edge along a lower inner portion 27 of the flat section 22. The lip portion 26 has an internal face 28 and an external face 29, wherein the external face can be mated with the interior surface 44 of the gauge display member 15 to form a tight seal. The broader surface area of external face 29 of lip portion 26 enables the mating of the rampart member with the gauge display member through a variety of mating techniques, such as with glue, double-sided tape, hook-and-loop type fasteners such as Velcro™, screws, single-sided tape and other known adhesives. In one embodiment, a chemical comprising methylene chloride can be employed which acts to weld the members together.

Figure 3:
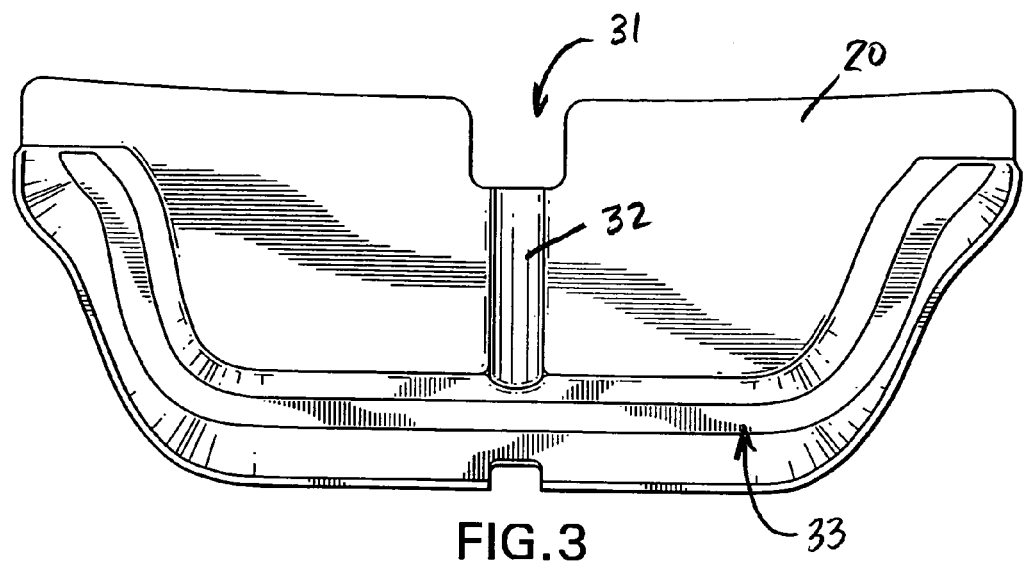
FIG. 3 is a rear elevational view of the rampart member of the present invention.

As further shown in FIGS. 2 and 3, the rampart member 20 can be provided with a notch 31 which may be used to guide wires associated with the instrument(s) to be enclosed within the gauge mounting assembly. A ridge 32 can also be provided for use as a guide or a means to accommodate a rear view mirror support, for example. As shown in FIG. 3, the ridge 32 provided in rampart member 20 meets with a back groove 33 formed by the creation of lip portion 26, which may be employed to facilitate wire concealment in one embodiment.

When the rampart member is securely engaged with the gauge display member, an opening 62 is created, which leads to a cavity portion 64 as shown in FIGS. 1 and 5. In operation, gauges and other instruments may be positioned within the cavity portion prior to or after the sealing of rampart member with gauge display member, and any wiring from the gauge(s) or instrument(s) is channeled through notch 31 and subsequently above a headliner or along the interior line where the windshield and roof of a vehicle meet, indicated generally at 65 in FIG. 4, and finally attached to the instrument or other device for which a connection is required. It will be appreciated that references herein to the term "gauge" or "instrument" can mean any of a variety of gauges, instruments, displays, lights, dials, needles, indicators or other item that can be used to reveal a characteristic, status, property, measurement or reading which a driver or passenger of a vehicle may find desirable to gain knowledge of or obtain. This should not be limited to vehicle performance gauges such as a tachometer and similar items. For example, in one embodiment of the invention, an instrument such as a wireless or satellite radio may be retained within the assembly of the present invention. It will further be appreciated that the term "gauge display member" should not be limited to a member for displaying only gauges.

Figure 4:
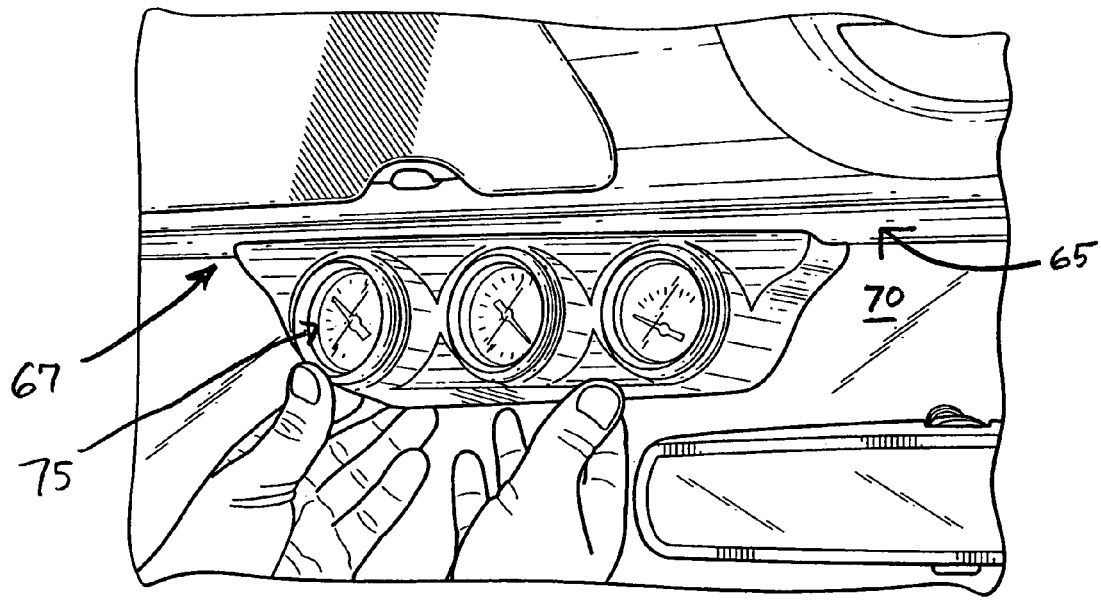
FIG. 4 is an illustrative schematic view showing the gauge frame member being installed in a vehicle interior.

The combined gauge display member and rampart member can be secured within a vehicle using a variety of attachment methods and devices. In one embodiment, an adhesive such as two-sided tape, hook-and-loop fasteners, glue or other suitable bonding adhesive can be placed on the windshield and/or the back of rampart member flat section 22 to adhere the device to the windshield. In another embodiment, a first bracket member (not shown) can be adhered to a windshield while a cooperating second bracket member (not shown) is adhered to the back of rampart member flat section 22. Then, the brackets are cooperatively engaged to securely support the device on the windshield of a vehicle. In another embodiment, the top edge of rampart member is snugly engaged between elements of the vehicle, such as the roof and the headliner of the vehicle as indicated at 67 of FIG. 4. It will be appreciated that a combination of the above methods and devices may be employed as necessary. As shown in FIG. 4, when the assembly is secured within the vehicle, the bottom, left and right edges of the beard portion 42 of gauge display member 15 align with the windshield or other support surface to provide a mating seam. In this way, the invention can provide an aesthetically appealing "factory look" while concealing unsightly wiring and other components maintained within the cavity of the assembly.

It will be appreciated that the gauge display assembly of the present invention may thereby be located at various locations within the vehicle depending upon the user's taste. In one embodiment, a kit can be provided in connection with the invention, including the gauge display member, rampart member, adhesive and/or other attachment mechanisms for securing the rampart member to the vehicle interior as well as for securing the rampart member to the gauge display member.

In constructing the present invention, the gauge display member 15 and rampart member 20 may be formed by creating a mold out of urethane or similar material, and vacuum sealing ABS plastic or other suitable material about the mold. The plastic member can then be trimmed and cut to provide the desired edges and/or openings. It will be appreciated that the positioning and retaining of gauges within the cavity created by securing the gauge display member and the rampart member, as well as the process steps of securing the assembly in place within a vehicle interior may occur in a variety of orders. For example, the gauge display member and rampart member may be secured together, and then gauges fed through openings 55, wiring first. Then the rampart member may be secured to the vehicle, such as against the windshield, above the headliner or both, with the wiring extending through notch 31 and up along or behind the headliner so as to effectuate concealment. Alternatively, gauges and wiring may be placed in the gauge display member as it is placed in position within the vehicle interior. Then, the rampart member may be brought into position such that the lip portion external surface mates with the gauge display member interior wall, thereby retaining the gauges and wiring within the formed cavity. The wiring may then be brought up through the opening 62 and notch 31 for feeding along ridge 32 and back groove 33 as described earlier. The rampart member can then be secured to the gauge display member and the assembly can then be secured to the vehicle interior in any of the manners described or the equivalents thereof. In one embodiment, the gauge display member itself can be secured to the vehicle without the use of the rampart member, such as by glue or other adhesive along the edges of the gauge display member. The particular dimensions of the gauge display member and rampart member and their elemental parts can, in one embodiment, be customized depending upon the target vehicle make and model and the desired location within the target vehicle.

It should be understood that the foregoing description and examples are only illustrative of the present invention; the optimum dimensional relationships for the parts of the invention, including variations in size, materials, shape, form, function and the manner of operation, assembly and use, are deemed readily apparent to one skilled in the art, and all equivalent relationships to those illustrated in the drawings and described in the specification are intended to be encompassed by the present invention. Thus, various alternatives and modifications can be devised by those skilled in the art without departing from the invention. Accordingly, the present invention is intended to embrace all such alternatives, modifications, and variances that fall within the scope of the appended claims.

What is claimed and desired to be secured by Letters Patent is:

1. An above-dash gauge display mount, comprising:
   a gauge display member having a face portion, a beard portion and an interior wall, said face portion having a substantially horizontal top edge lying in a substantially horizontal plane when said mount is in an upright position, said beard portion integrally formed with said face portion, said face portion further including at least one opening therein; and
   a rampart member not integrally formed with said gauge display member and securable to said interior wall of said gauge display member, said rampart member having a substantially flat section having at least an upper edge and left and right edges, said rampart member further having an inflexible lip portion extending from the left edge to the right edge along a lower inner portion of said flat section, said lip portion having an internal and external face such that said external face can mate securely therealong with said gauge display member interior wall, thereby creating an opening between said gauge display member top edge and said rampart member upper edge.

2. The mount of claim 1 wherein said rampart member top edge is formed to include a notch.

3. The mount of claim 1 wherein said rampart member lip portion is concealed from view when secured to the gauge display member interior wall.

4. The mount of claim 1 wherein said face portion opening is configured to receive an instrument.

5. The mount of claim 1 wherein said rampart member upper edge extends above said plane of said face portion top edge when said mount is in an upright position.

6. The mount of claim 1 wherein said rampart member upper edge is securable between the headliner and the hard top of a vehicle.

7. The mount of claim 1 wherein said face portion left and right edges extend upwardly and outwardly from a lower edge of said face portion to said top edge.

8. The mount of claim 1 wherein said rampart member flat section has an exterior face which is securable to a windshield of a vehicle.

9. The mount of claim 1 further including mounting means for securing said rampart member to a vehicle portion.

10. The mount of claim 9 wherein said mounting means comprises a windshield bracket.

11. The mount of claim 9 wherein said mounting means comprises glue.

12. The mount of claim 9 wherein said face portion includes at least one substantially circular ring, said ring forming the perimeter of said opening.

13. The mount of claim 12 wherein said at least one ring is offset such that a portion of said ring extends outwardly from said face portion and a portion of said ring extends into said face portion.

14. The mount of claim 12 wherein said ring is integrally formed with said face portion.

15. An after-market gauge display assembly, comprising:
    a rampart configured so as to reside against a windshield, the rampart including an inflexible lip portion; and
    a gauge display member not integrally formed with the rampart and secured to said rampart lip portion so as to form an opening between the rampart and the gauge display member.

16. An after-market gauge display assembly, comprising:
    a gauge display member having an inner wall and a ring member forming an opening in said gauge display member; and
    a rampart member having an inflexible lip portion extending from an inner surface thereof, said lip portion thereby forming a back groove on an outer surface of said rampart member capable of concealing one or more wires, said lip member further having an exterior facing surface not integrally formed with and cooperatively engaging said gauge display member inner wall.

17. The assembly of claim 16 wherein said rampart member further includes a ridge extending from said inner surface thereof.

18. The assembly of claim 17 wherein said rampart member further includes a notch adjacent said ridge formed therein.

19. The assembly of claim 16 wherein said gauge display member has a face portion with a left and a right edge, said edges extending upwardly and outwardly from a lower edge of the face portion to a top edge of the face portion.

20. The assembly of claim 16 wherein said rampart member and said gauge display member each have a respective top edge, wherein said top edges are in substantially parallel planes and wherein said rampart member top edge extends higher than said gauge display member top edge.

* * * * *